United States Patent [19]
Nagaoka et al.

[11] Patent Number: 6,096,976
[45] Date of Patent: Aug. 1, 2000

[54] RELAY APPARATUS BETWEEN RELATIVE ROTARY MATERIALS

[75] Inventors: Yasutaka Nagaoka; Nobuhiko Suzuki, both of Shizuoka-ken, Japan

[73] Assignee: Yazaki Corporation, Tokyo, Japan

[21] Appl. No.: 09/161,958

[22] Filed: Sep. 29, 1998

Related U.S. Application Data

[62] Division of application No. 08/744,528, Nov. 6, 1996, Pat. No. 5,841,069.

[30] Foreign Application Priority Data

Nov. 9, 1995 [JP] Japan ................... P 7-291369

[51] Int. Cl.⁷ .................................................. H01B 7/06
[52] U.S. Cl. ........................ 174/69; 174/135; 174/70 R; 242/580
[58] Field of Search ............................ 174/135, 69, 70 R, 174/71 R; 242/580, 580.1, 396.6, 407, 422.5; 439/4, 501

[56] References Cited

U.S. PATENT DOCUMENTS

| | | | |
|---|---|---|---|
| 342,354 | 5/1886 | Harper ...................... | 242/405 |
| 3,807,652 | 4/1974 | Kruhn et al. .............. | 242/332 |
| 3,815,078 | 6/1974 | Fredrick ................... | 439/501 |
| 4,844,359 | 7/1989 | Kato ......................... | 242/402 |

FOREIGN PATENT DOCUMENTS

4-333473  11/1992  Japan.
5-53183   7/1993   Japan.

*Primary Examiner*—Kristine Kincaid
*Assistant Examiner*—Kamand Cuneo
*Attorney, Agent, or Firm*—Finnegan, Henderson, Farabow, Garrett & Dunner, L.L.P.

[57] ABSTRACT

A relay apparatus between relative rotary members has a first rotator (a rotator) having an inner cylindrical portion, a second rotator (a fixed body) having an outer cylindrical portion for surrounding the inner cylindrical portion at a predetermined interval, and for rotating relative to the inner cylindrical portion, a flexible flat cable coiled along the inside of the circular space between the inner cylindrical portion and the outer cylindrical portion, wherein the terminal portion of the inner circumference and the terminal portion of the outer circumference of the flexible flat cable are held in the inner cylindrical portion and the outer cylindrical portion, respectively, and a C-shaped mobile body is disposed in a freely movable manner for reversing the flexible flat cable in the aperture, wherein the mobile body is defined so that an inner circumferential side is polygon-shaped. The C-shaped movable member comprises a planar horizontal rib with a planar upper rib projecting vertically to contact the upper cover and a planar lower rib projecting to contact the lower cover and has a gap in its perimeter defined by first and second end portions, one having a concave and one a convex surface.

4 Claims, 8 Drawing Sheets

RELAY APPARATUS BETWEEN RELATIVE ROTARY MATERIALS

This is a division of application Ser. No. 08/744,528, filed Nov. 6, 1996 now U.S. Pat. No. 5,841,069.

BACKGROUND OF THE INVENTION

1. Field of the invention

The invention relates to a relay apparatus between relative rotary members which connect rotary members electrically through a cable.

2. Description of the Related Art

According to conventional relay apparatus between relative rotary members, for example, if an inner cylindrical portion rotates counterclockwise, the cable moves to wind around the inner cylinder. Therefore, the cable outside of the C-shaped mobile body is contacted with the outer circumferential side of the mobile body. Furthermore, while the cable is contacted to one end of the mobile body, the cable is reversed and passes inside the mobile body, and the cable winds around the inner cylinder. In this case, the one end of the mobile body is pushed by the cable, so that the mobile body rotates counterclockwise.

When the inner cylinder rotates clockwise toward the outer cylinder, the cable which is wound around the inner cylinder unwinds outward from the inner cylinder. Thus, the cable which is wound around the inner cylindrical portion contacts the inner circumferential side of the mobile body. Furthermore, when the cable is contacted with the other end portion of the mobile body, the cable is reversed and passes outside of the mobile body. Thereby, the cable is contacted with an inside of the outer cylindrical portion. In this case, the other end portion of the mobile body is pushed by the cable, so that the mobile body rotates clockwise.

In relay apparatus between relative rotary members, when the inner cylinder rotates clockwise, the cable is rewound. While the cable is contacted with the inner circumferential surface, the cable moves. The moving direction of the cable is the direction of the tangent of the inner circumferential surface. Since the inner circumferential surface is curved, it presses against the front of the cable. Therefore, the cable has a high moving resistance. Accordingly, the cable generates a compressive stress. More particularly, the cable located between the one end element of the mobile body and the other aperture may buckle, so that the cable rises outward. Since such buckling shortens a life of a cable, it is essential to prevent buckling. Accordingly, there may also be provided an apparatus having a protrusion which is installed at the inner circumferential side in order to reduce sleeve resistance. However, when such protrusion is installed, a moving resistance is caused rather than reduced due to this protrusion.

SUMMARY OF THE INVENTION

The present invention is directed to solving the above mentioned problems. It is an object of the present invention to provide a relay apparatus between relative rotary members for reducing a moving resistance which flexible flat cable causes on the mobile body within the apparatus.

According to one aspect of the invention, a relay apparatus between relative rotary materials comprises: a first rotator having an inner cylindrical portion; a second rotator having an outer cylindrical portion for surrounding the inner cylindrical portion at a predetermined interval, and for relative rotation of the inner cylindrical portion; a portion and the outer cylindrical portion, a terminal portion of the inner circumference and a terminal portion of the outer circumference of the flexible flat cable being held in the inner cylindrical portion and the outer cylindrical portion, respectively; and a C-shaped mobile body installed in a freely movable manner for reversing the flexible flat cable in an aperture, wherein the mobile body is defined so that an inner circumferential side is polygon-shaped.

In another aspect of the invention, there is a relay apparatus between relative rotary members, wherein the mobile body which comprises: a horizontal rib projected in a horizontal direction, the horizontal rib having an inner circumferential side that is polygon-shaped.

According to further aspect of the invention, there is a relay apparatus between relative rotary materials which comprises: a first rotator having an inner cylindrical portion; a second rotator having an outer cylindrical portion for surrounding the inner cylindrical portion at a predetermined interval, and relatively rotating in the inner cylindrical portion; a flexible flat cable coiled along the inside of a circular space between the inner cylindrical portion and the outer cylindrical portion, the terminal portion of an inner circumference and a terminal portion of the outer circumference of the flexible flat cable being held in the inner cylindrical portion and the outer cylindrical portion, respectively; a C-shaped mobile body installed along the space in a freely movable manner for reversing the flexible flat cable in the aperture; an upper cover installed in order to cover the upper side of the space; and a lower cover installed in order to cover the lower side of the space, wherein the mobile body comprises: a plate-shaped horizontal rib defined as being a C-shape; a plate-shaped upper rib which extends from the horizontal rib toward the upper side in order to be in contact with the upper cover; a plate-shaped lower rib which extends from the horizontal rib toward the lower side in order to be in contact with the lower cover, wherein the upper rib and lower rib are arranged so as to shift in the radial direction.

According to one aspect of the invention, by rotating the inner cylindrical portion and the outer cylindrical portion relatively, a flexible flat cable is rewound from the inner cylindrical portion. Thereby, the flexible flat cable is contacted with the inner circumferential side of the mobile body. Furthermore, the flexible flat cable is reversed in an aperture, so that the flexible cable moves outside of the mobile body. Since the inner circumferential side of the mobile body is polygon-shaped, the flexible flat cable moves while contacting with each plane of the inner circumferential side of the mobile body. Accordingly, since the inner circumferential side is not curved and does not prevent the beginning of movement of the flexible flat cable, it is possible to reduce a moving resistance against the flexible flat cable. Furthermore, since the inner circumferential side of the mobile body is polygon-shaped, it is possible to minimize an area where the flexible flat cable contacts the mobile body, such as over a line. Accordingly, it is possible to reduce frictional force where the mobile body acts on the flexible flat cable. That is, it is possible to reduce moving resistance due to a friction acting on the flexible flat cable. Thus, since it is possible to reduce moving resistance acting on the flexible flat cable, it is possible to prevent buckling of the flexible flat cable.

According to another aspect of the invention, since the polygon-shaped inner circumferential side has a horizontal rib, it is possible to minimize an area where a flexible flat cable is contacted with the mobile body. Accordingly, it is possible to reduce moving resistance on a flexible flat cable.

According to further aspect of the invention, the upper rib and lower rib are shifted toward in a radial direction in order to be installed. Accordingly, if the upper cover and the lower cover engage the upper rib and the lower rib, respectively, the horizontal rib can assume an elastic deformation from bending. That is, the reaction force hardly acts against the upper cover and the lower cover, so that the mobile body corresponds to the distance between the upper cover and lower cover. Accordingly, since it is possible to minimize frictional force between the upper cover and the upper rib and frictional force between the lower cover and the lower rib, it is possible to reduce moving resistance and sleeve noise of the mobile body. Furthermore, since the mobile body is usually contacted with the upper cover and the lower cover, it is possible to prevent shaking and noise due to the gap between the mobile body and the upper cover and the lower cover.

DETAILED DESCRIPTION OF THE PREFERRED EMBODIMENTS

Figure 1:
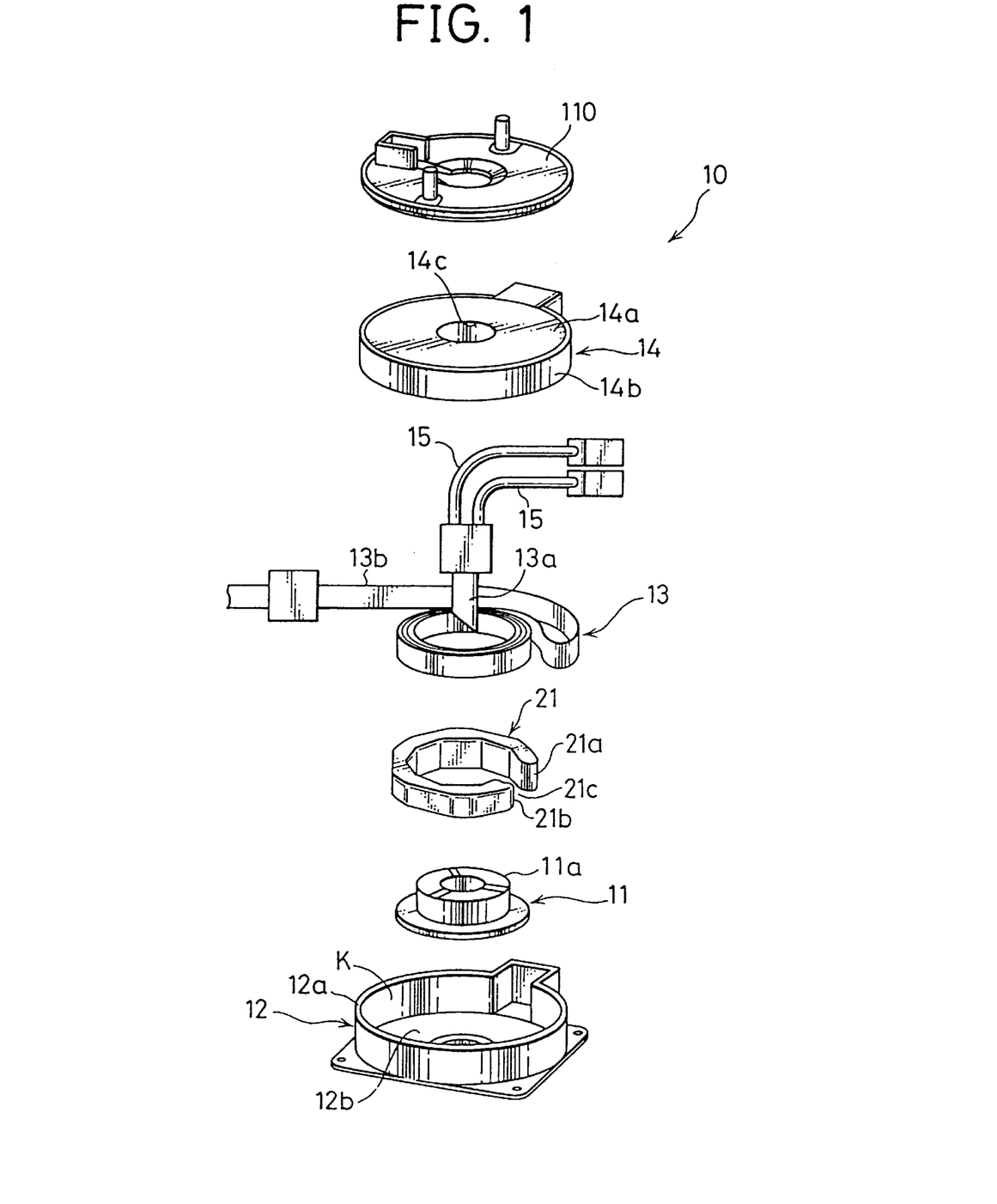
FIG. 1 shows an exploded perspective view of a relay apparatus between relative rotary members according to the first embodiment of the present invention.
Figure 2:
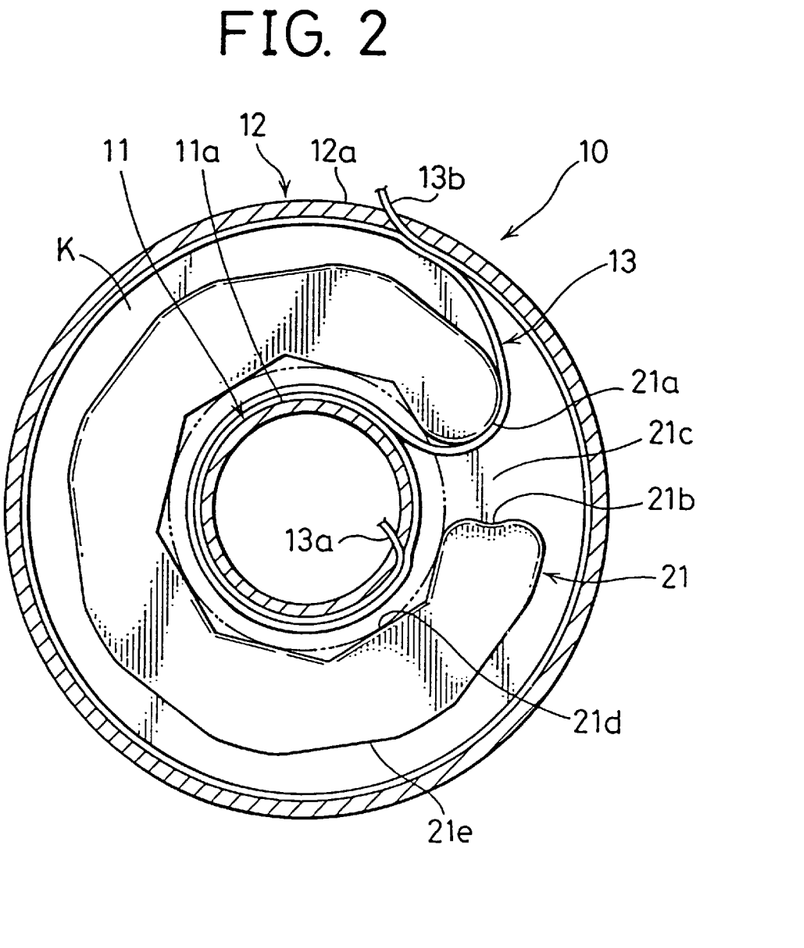
FIG. 2 shows a cross-sectional view of a principal portion of a relay apparatus between relative rotary members according to the first embodiment of the present invention.
Figure 3:
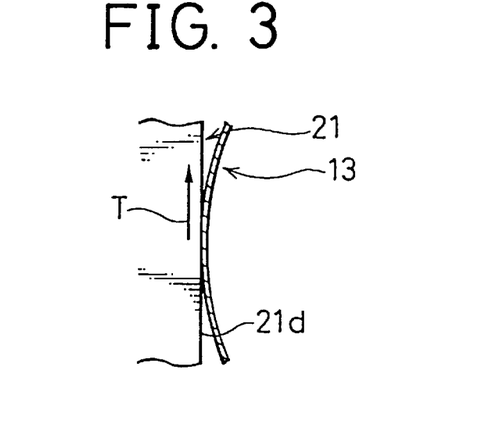
FIG. 3 shows an effect of a relay apparatus between relative rotary members according to the first embodiment of the present invention.
Figure 4:
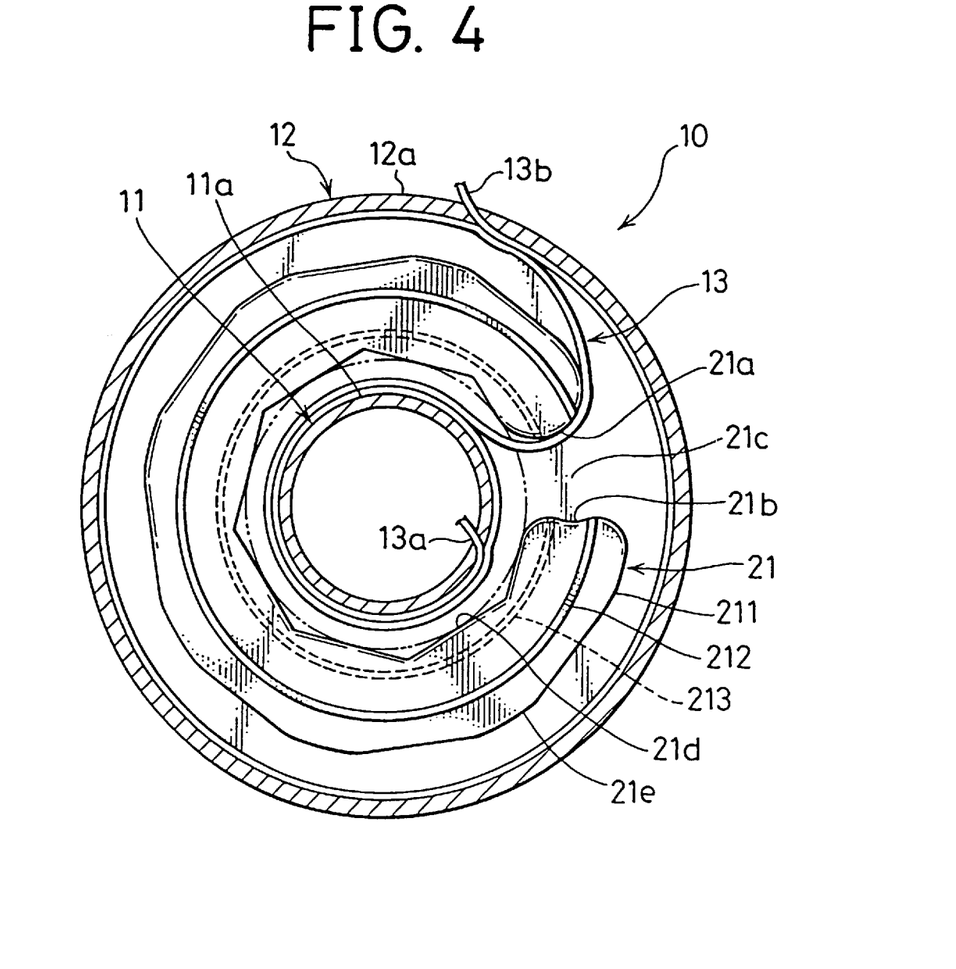
FIG. 4 shows a cross-sectional view of a principal portion of a relay apparatus between relative rotary members according to the second embodiment of the present invention.
Figure 5:
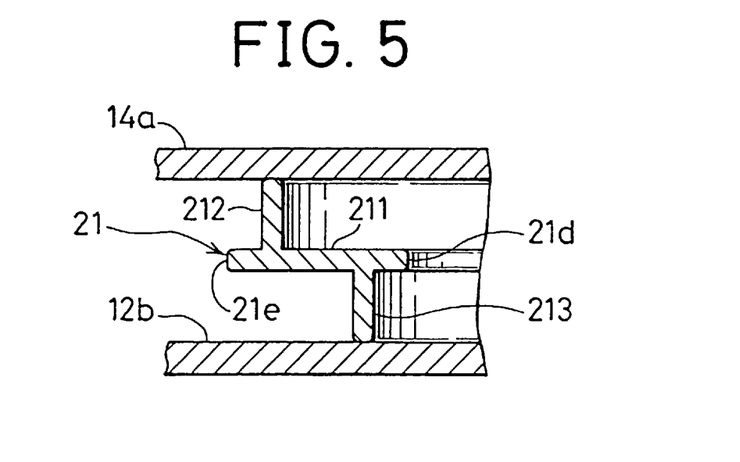
FIG. 5 shows a cross-sectional view of a mobile body of a relay apparatus between relative rotary members according to the second embodiment of the present invention.
Figure 6:
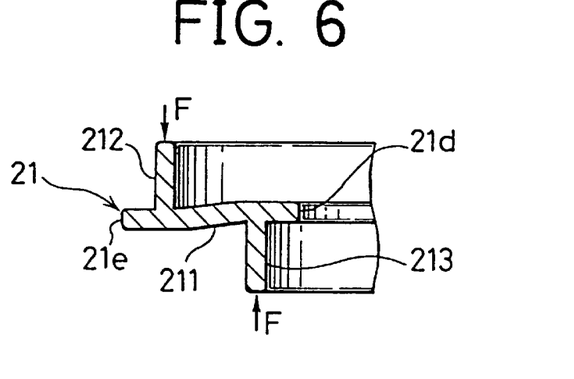
FIG. 6 shows a cross-sectional view of an effect of a relay apparatus between relative rotary members according to the second embodiment of the present invention.

Embodiments of the present invention are explained below in detail using FIG. 1–FIG. 15. FIG. 1, FIG. 2 and FIG. 3 show the first embodiment. FIG. 4, FIG. 5 and FIG. 6 show the second embodiment. FIG. 7–FIG. 15 show the third embodiment.

Embodiment 1

As shown in FIG. 1, a relay apparatus between relative rotary members 10 comprises a rotator (a first rotator) 11 having an inner cylindrical portion 11a, a fixed body (a second rotator) 12 having an outer cylindrical portion 12a which surrounds the inner cylindrical portion 11a at a predetermined interval, a cable (a flexible flat cable) 13 which is coiled along an inside of a circular space K between the inner cylindrical portion 11a and the outer cylindrical portion 12a in order to be accommodated; wherein, a terminal portion of the inner circumference 13a and a terminal portion of the outer circumference 13b are held in the inner cylindrical portion 11a and the outer cylindrical portion 12a, respectively, and a C-shaped mobile body 21 which is installed along the space K in a freely movable manner, so that the cable 13 can be reversed at aperture 21c.

The fixed body 12 comprises a cover 14 to cover an upper side of the space K and a surrounding of the outer cylindrical portion 12a. The cover 14 comprises an upper cover 14a which covers at an upper side of the space K and a cylindrical portion 14b which surrounds the outer cylindrical portion 12a. Accordingly, the cover 14 cannot rotate toward the fixed body 12 relatively. At the center portion of the upper cover 14a is aperture 14c. In the fixed body 12 is lower cover 12b for covering at a lower side of the space K together with the outer cylindrical portion 12a. Furthermore, at the top of the cover 14, a cover for outer connecting 110 is installed in a freely rotatable manner. The cover for outer connecting 110 is connected to the inner cylindrical portion 11a through the aperture 14c. Thereby, the connecting portion between the terminal portion of the inner circumference 13a and the outer cable 15 is held.

The rotator 11 is coupled to, for example, a steering wheel in a handle portion of a car. The fixed body 12 can be fixed at a side of a steering column.

As shown in FIG. 2, an inner circumferential side 21d and an outer circumferential side 21e are equilateral octagon-shaped. Each angle portion of the outer circumferential side 21e is circular arc-shaped, so that it is possible to wind or unwind the cable 13 smoothly.

Furthermore, one end portion 21a is circular convex in order to be set along the cable 13 which is reversed and changed to a U-shape. While the other end portion 21b is circular concave in order to be set along a top of the cable 13 which is reversed and changed to a U-shape. In addition, mobile body 21 is composed of a smooth material, for example, nylon, polyvinyl acetal, Teflon (polytetrafluoroethylene), a fluoric polymer and so on.

As shown in FIG. 2, according to a relay apparatus between relative rotary members 10, for example, if inner cylindrical portion 11a rotates toward outer cylindrical portion 12a counterclockwise, the cable 13 moves in order to wind around the inner cylindrical portion 11a. Thereby, the cable 13 outside of the mobile body 21 is contacted with the outer circumferential side 21e. Furthermore, the cable 13 is reversed along one end portion 21a and changed to a U-shape, and entered inside the mobile body 21 in order to wind around the inner cylindrical portion 11a. In this case, the one end portion 21a of the mobile body 21 is pushed by the cable 13, so that the mobile body can rotate counterclockwise.

When the inner cylindrical portion 11a rotates clockwise, the cable 13 is unwound from the inner cylindrical portion 11a, so that the cable 13 moves to expand outward. Thus, the cable 13 is contacted with the inner circumferential side 21d of the mobile body 21. Furthermore, when the cable 13 is contacted with the other end portion 21b, the cable 13 is reversed and changed to a U-shape. The cable 13 is moved outside of the mobile body 21, so that the cable 13 is contacted with the inside of the outer cylindrical portion 12a. In this case, the other end portion 21b of the mobile body 21 is pushed by the cable 13, so that the mobile body can rotate clockwise.

According to the relay apparatus between relative rotary members 10, an inner circumferential side 21d of the mobile body 21 is an octagon. Accordingly, when the inner cylindrical portion 11a rotates clockwise, the inner circumferential side 21d is not curved. Accordingly, the inner cylindrical portion 11a does not resist movement in the direction T of cable 13 (see FIG. 3). Thereby, it is possible to reduce moving resistance on the cable 13. Furthermore, since the inner circumferential side 21d of the mobile body 21 is an octagon, it is possible for the cable 13 to contact with the mobile body 21, such as over a line. That is, it is possible to minimize an area where the cable 13 is contacted with the mobile body 21. Accordingly, it is possible to reduce frictional force which the mobile body 21 exerts on the cable 13. It is possible to reduce moving resistance due to friction against the cable 13. As described above, since it is possible to reduce moving resistance on the cable 13, it is possible to prevent buckling of the cable 13.

Although an inner circumferential side 21d of the mobile body 21 is an equilateral octagon, it is not necessarily restricted to an equilateral octagon. Therefore, other polygon-shapes may be used. However, preferably, an equilateral polygon is used. Furthermore, the outer circumferential side 21e may be circular arc-shaped.

Embodiment 2

Next, an embodiment of the present invention is explained below in detail referring to FIG. 4, FIG. 5 and FIG. 6. The elements having the same reference numbers in the second embodiment (FIG. 4, FIG. 5 and FIG. 6) are the same portions or corresponding portions in the first embodiment (FIG. 1, FIG. 2 and FIG. 3). Accordingly, the detailed explanation of the same portions is simplified. The difference between the first and second embodiments is a mobile body 21 comprises a horizontal rib 211, an upper rib 212 and a lower rib 213.

As shown in FIG. 4 and FIG. 5, mobile body 21 comprises a plate-shaped horizontal rib 211 which is a C-shape, a plate-shaped upper rib 212 which projects from the horizontal rib 211 toward an upper side and contacts an upper cover 14a, and a plate-shaped lower rib 213 which projects from the horizontal rib 211 toward the lower side and is contacted with a lower cover 12b. The horizontal rib 211 has an inner circumferential side that is an equilateral octagon. The upper rib 212 and lower rib 213 are shifted in the radial direction in order to be installed.

The outer circumferential side 21e of the horizontal rib 211 is an equilateral octagon-shape whose each angle portion is circular arc-shaped. Accordingly, it is possible to wind or unwind the cable 13 smoothly. Furthermore, a one end portion 21a and the other end portion 21b are defined by the horizontal rib 211. In order to reverse the cable 13 and change to a U-shape, the one end portion 21a is circular convex-shaped. While the other end portion 21b is circular concave-shaped corresponding to the shape of a top of the cable 13 which is reversed and changed to the U-shape. In addition, a mobile body 21 is composed of a smooth material, for example, nylon, polyvinyl acetal, fluoric polymer and so on.

As described above, according to the relay apparatus between relative rotary members 10, the inner circumferential side 21d of the horizontal rib 211 is an octagon. Accordingly, the cable 13 moves while being contacted with each side of the inner circumferential side 21d of the horizontal rib 211. Accordingly, the inner circumferential side 21d is not curved, so that the inner circumferential side 21d does not resist movement in the direction T of the cable 13 (see FIG. 3). Thereby, moving resistance on the cable 13 is reduced. Furthermore, the inner circumferential side 21d of the horizontal rib 211 is contacted with the cable 13 at a point. Accordingly, there is less area where the cable 13 is contacted with the mobile body 21 than the area in using the first embodiment. Accordingly, it is possible to reduce moving resistance due to friction acting on the cable 13.

Furthermore, an upper cover 14a and a lower cover 12b exert force F on upper rib 212 and lower rib 213, respectively. The upper rib 212 and lower rib 213 are shifted in a radial direction in order to be installed. Accordingly, as shown in FIG. 5 and FIG. 6, it is possible for horizontal rib 211 to have an elastic deformation. Thus, the reaction force acts weakly on the upper cover 14a and the lower cover 12b, so that mobile body 21 has the dimensions of the distance between the upper cover 14a and lower cover 12b. Accordingly, frictional force is minimized between the upper cover 14a and the upper rib 212 and frictional force between the lower cover 12b and the lower rib 213, not only is moving resistance reduced on mobile body 21, but also sleeve noise. Furthermore, since mobile body 21 is usually contacted with upper cover 14a and lower cover 12b, shaking and a noise due to the gap between the mobile body 21, and upper cover 14a and lower cover 12b is prevented.

The second embodiment comprises an upper rib 212 and a lower rib 213 connected with upper cover 14a and lower cover 12b, respectively. However, there can be a distance between the upper rib 212 and the upper cover 14a. The upper rib 212 and lower rib 213 are shifted in a radial direction. The upper rib 212 and lower rib 213 can also be arranged up and down.

Furthermore, a horizontal rib 211 can be installed in a mobile body 21 of the first embodiment. Although the inner circumferential side 21d of the horizontal rib 211 is described an equilateral octagon, it is not necessarily restricted to an equilateral octagon and may have other polygon-shapes. However, preferably, it is an equilateral polygon. Furthermore, the outer circumferential side 21e may be simply circular arc-shaped.

Embodiment 3

An embodiment of the present invention is explained below in detail referring to FIG. 7–FIG. 15. The elements having the same reference numbers in the third embodiment (FIG. 7–FIG. 15) are the same portions or corresponding portions in the second embodiment (FIG. 1, FIG. 2 and FIG. 3). Accordingly, the detailed explanation of the same portions are simplified. The difference between the second and third embodiments is that the mobile body 21 comprises a framework structure.

That is, as shown in FIG. 7–FIG. 15, mobile body 21 comprises a C-shaped horizontal rib 211, an upper rib 212 which is projected from the horizontal rib 211 toward an upper side, and a lower rib 213 which is projected from the horizontal rib 211 toward an lower side. The horizontal rib 211 comprises an inner circumferential stick-shaped element 211a comprising an inner circular portion, an outer circumferential stick-shaped material 211b comprising an outer circular portion, and a plurality of horizontal stick-shaped elements 211c for coupling the inner circumferential stick-shaped element 211a to the outer circumferential stick-shaped element 211b. The upper rib 212 comprises an upper circular stick-shaped element 212a comprising an upper terminal portion, and a plurality of upper vertical stick-shaped elements 212b for coupling the upper circular stick-shaped element 212a to a horizontal stick-shaped element 211c. The lower rib 213 comprises a lower circular stick-shaped element 213a for comprising a lower terminal portion, and a plurality of lower vertical stick-shaped elements 213b for coupling the lower circular stick-shaped element 213a to the horizontal stick-shaped element 211c.

Figure 7:
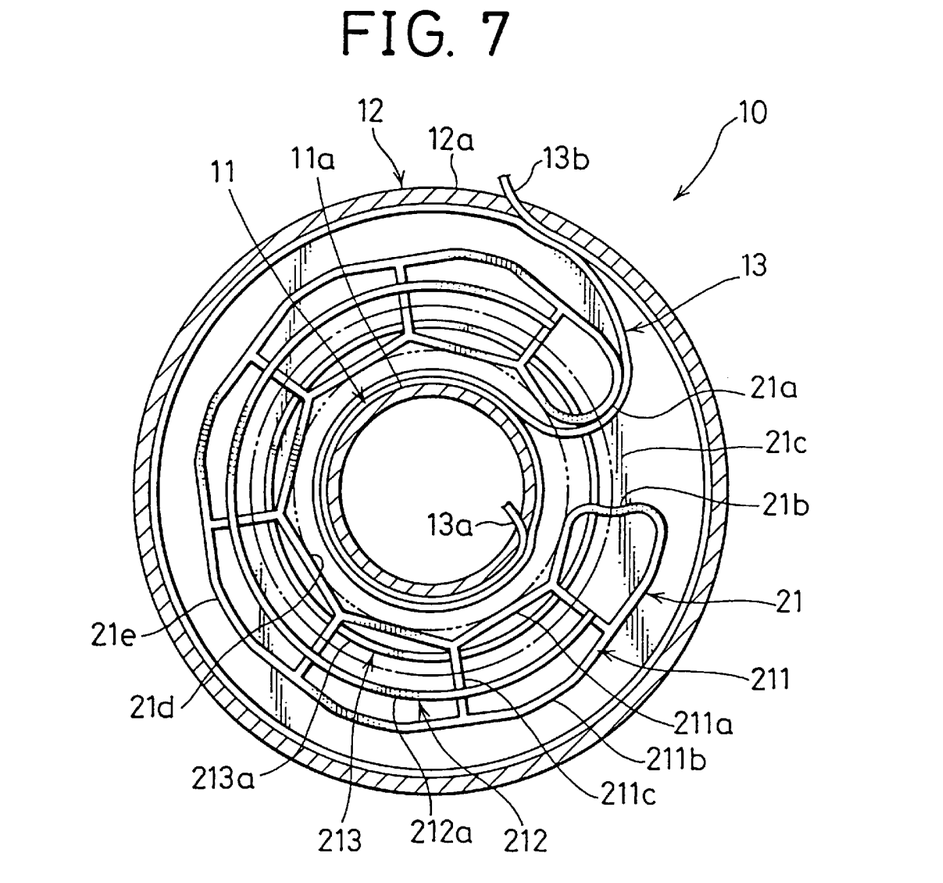
FIG. 7 shows a cross-sectional view of a principal portion of a relay apparatus between relative rotary members according to the third embodiment of the present invention.
Figure 8:
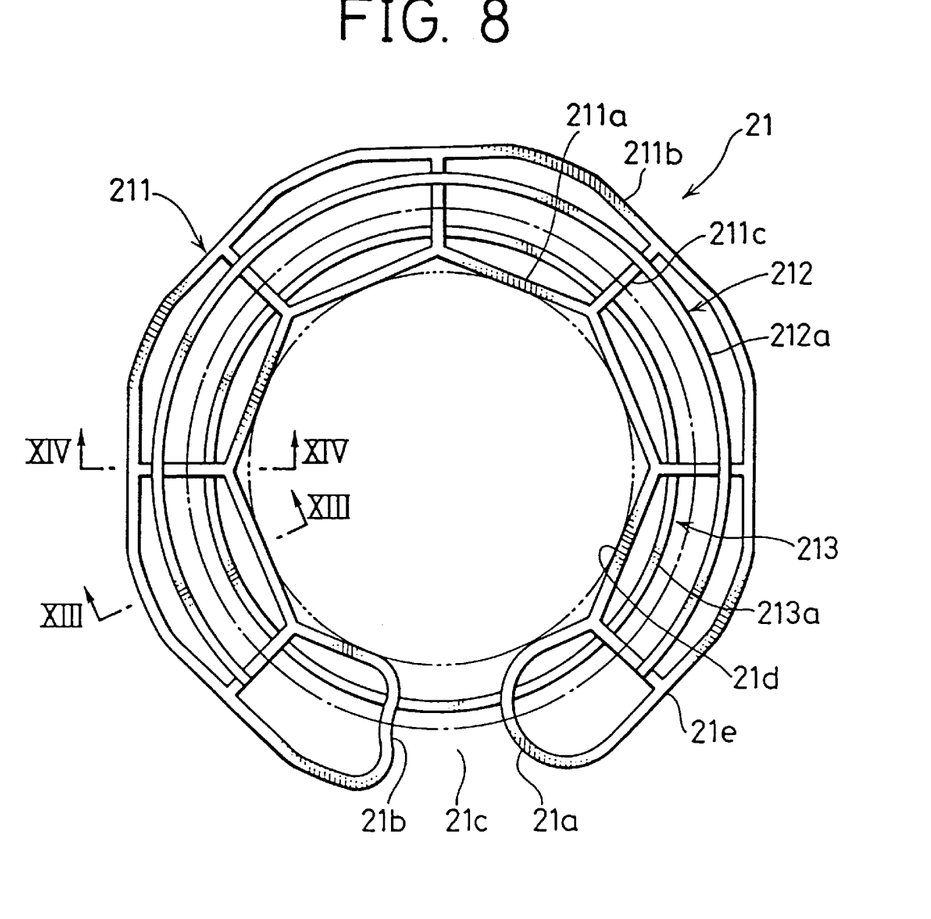
FIG. 8 shows a plan view of a mobile body of a relay apparatus between relative rotary members according to the third embodiment of the present invention.
Figure 9:
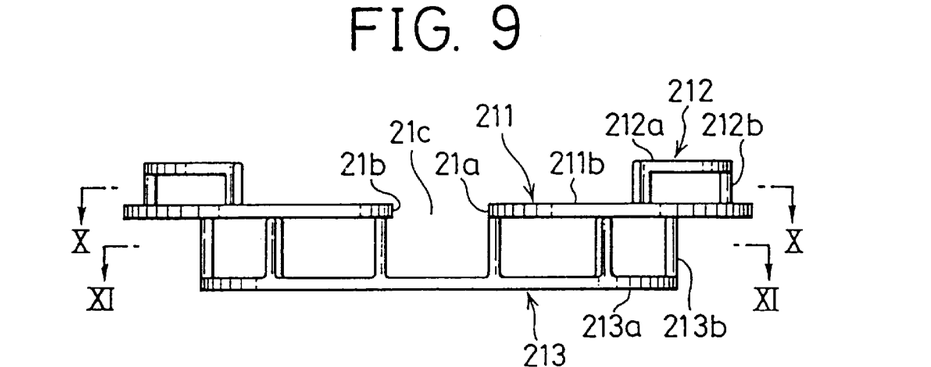
FIG. 9 shows a lateral view of a mobile body of a relay apparatus between relative rotary elements according to the third embodiment of the present invention.
Figure 10:
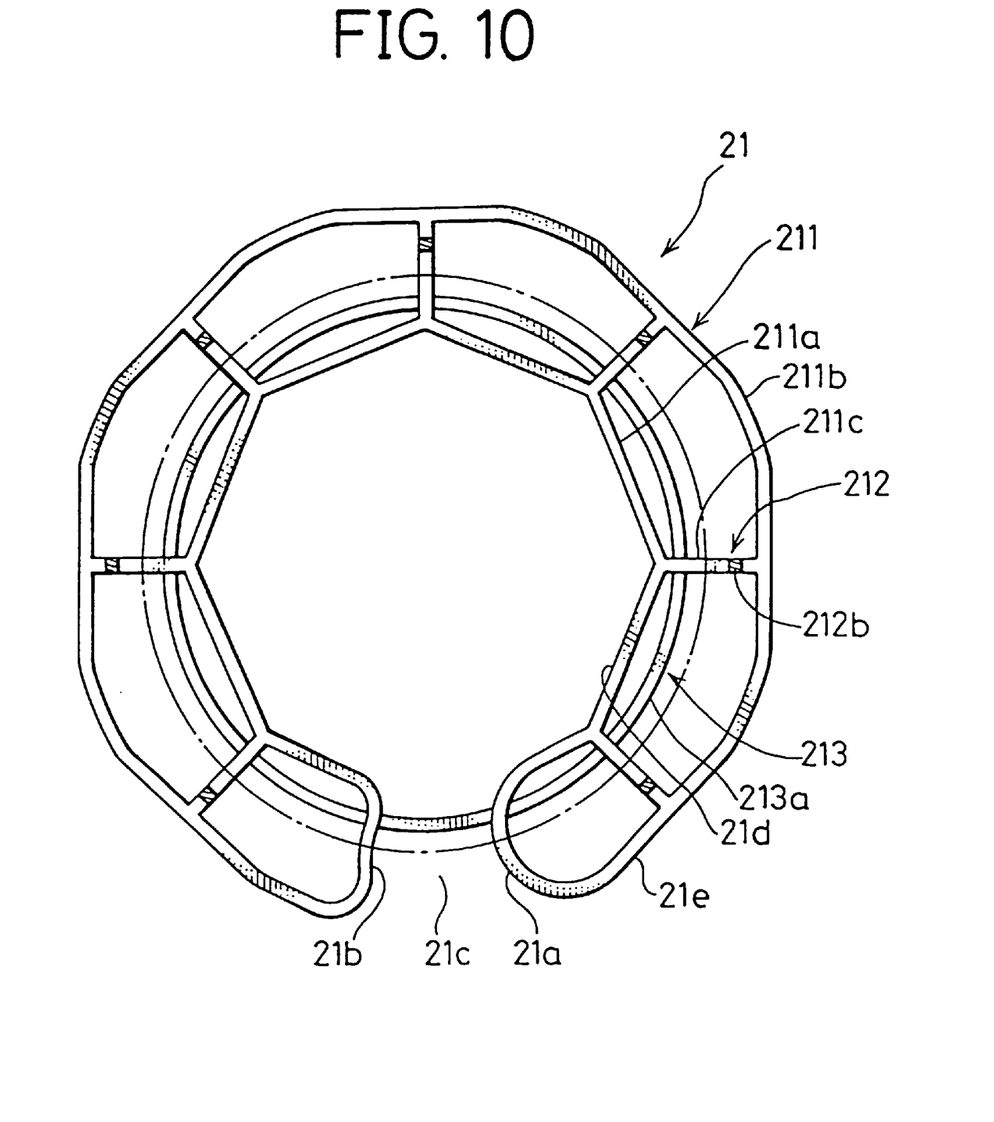
FIG. 10 shows a mobile body of a relay apparatus between relative rotary members according to the third embodiment of the present invention, a cross-sectional view taken along section line X—X of FIG. 9.
Figure 11:
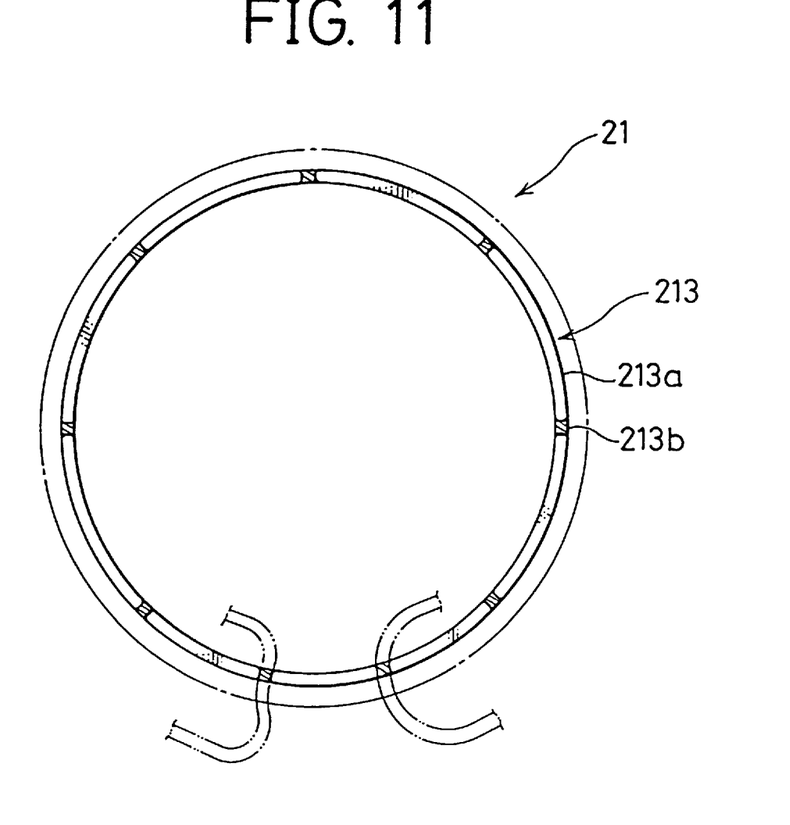
FIG. 11 shows a mobile body of a relay apparatus between relative rotary members according to the third embodiment of the present invention, a cross-sectional view taken along section line XI—XI of FIG. 9.

The inner circumferential stick-shaped element 211a and the outer circumferential stick-shaped element 211b are octagon-shaped. However, each angle portion of the outer circumferential stick-shaped element 211b is circular arc-shaped so that the cable 13 can be wound smoothly. Furthermore, a length of the upper vertical stick-shaped element 212b and lower vertical stick-shaped element 213b is set so that the upper circular stick-shaped element 212a and the lower circular stick-shaped element 213a are connected to an upper cover 14a and a lower cover 12b, respectively. Furthermore, the upper vertical stick-shaped element 212b and lower vertical stick-shaped element 213b are shifted in a radial direction in order to be connected to the horizontal stick-shaped element 211c. The lower circular stick-shaped element 213a is a complete circle without an aperture, so that the lower circular stick-shaped element 213a can exist in aperture 21c.

Furthermore, a one end portion 21a and the other end portion 21b are defined by a coupling portion where an inner circumferential stick-shaped element 211a is coupled to an outer circumferential stick-shaped element 211b. The one end portion 21a is circular convex in order to reverse the cable 13 and change to a U-shape. While the other end portion 21b is circular concave corresponding to a top of the cable 13 which is reversed and changed to a U-shape. In addition, mobile body 21 is composed of a smooth material, for example, a nylon, a polyvinyl acetal, Teflon (polytetrafluoroethylene), a fluoric polymer and so on.

Figure 12:
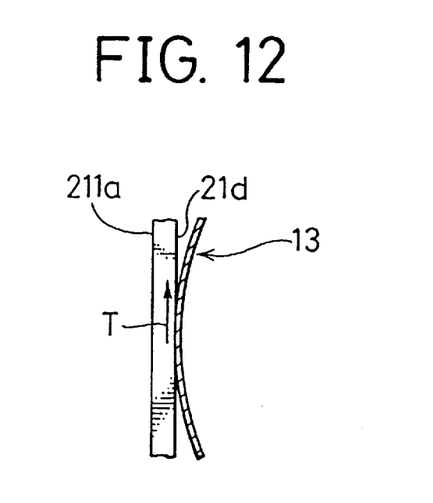
FIG. 12 shows an effect of a relay apparatus between relative rotary members according to the third embodiment of the present invention.

As described above, in the relay apparatus disposed between relative rotary elements 10, since mobile body 21 comprises a framework structure, it is possible to lighten the mobile body 21 considerably. Accordingly, it is possible to minimize moving resistance against the cable 13. Furthermore, since inner circumferential stick-shaped element 211a has an equilateral octagon-shape, the cable 13 can contact each straight-lined inner circumferential side 21d of the inner circumferential stick-shaped element 211a. Therefore, as shown in FIG. 12, the inner circumferential surface 21d is not curved, so that it does not interfere with moving direction T of the cable 13. Accordingly, it is possible to reduce the moving resistance against the cable 13. Since the cable 13 is contacted with the inner circumferential surface 21d comprising the inner circumferential stick-shaped element 211a, it is possible to minimize an area where the cable 13 is contacted with the mobile body 21. Accordingly, it is possible to reduce the moving resistance due to a friction against cable 13.

Figure 13:
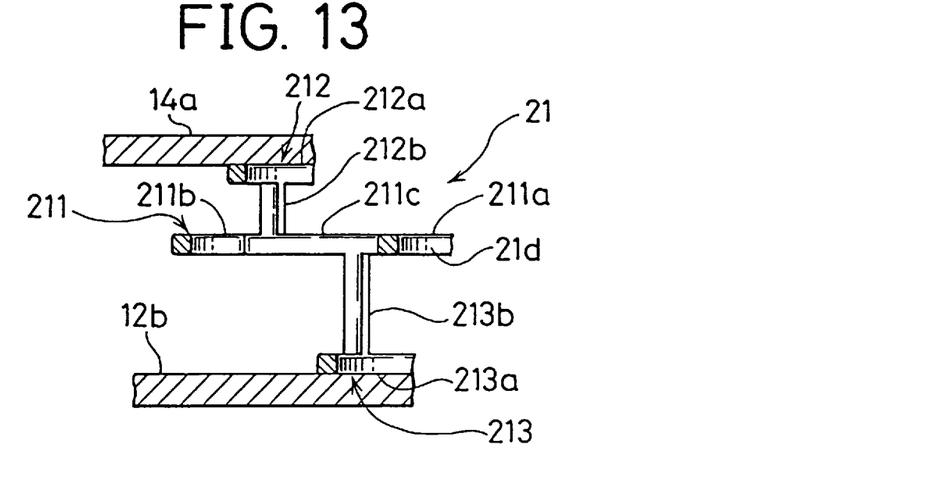
FIG. 13 shows a mobile body of a relay apparatus between relative rotary members according to the third embodiment of the present invention, a cross-sectional view taken along section line XIII—XIII of FIG. 8.
Figure 14:
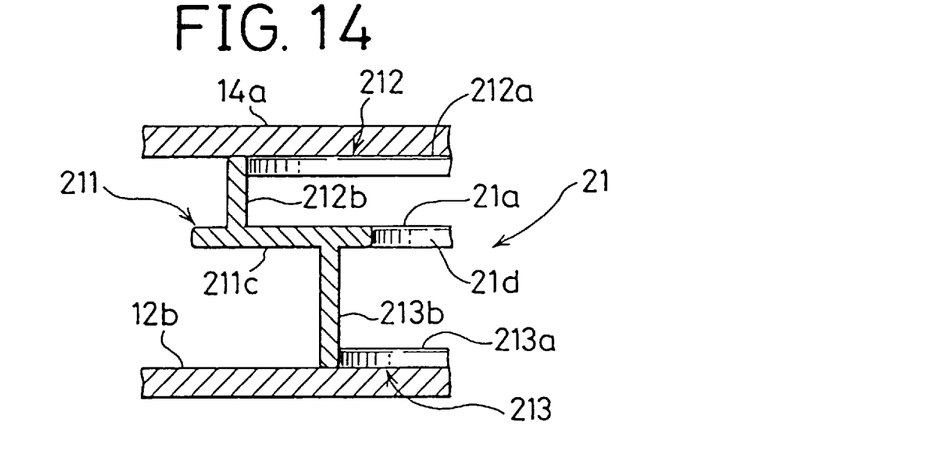
FIG. 14 shows a mobile body of a relay apparatus between relative rotary members according to the third embodiment of the present invention, a cross-sectional view taken along section line XIV—XIV of FIG. 8.
Figure 15:
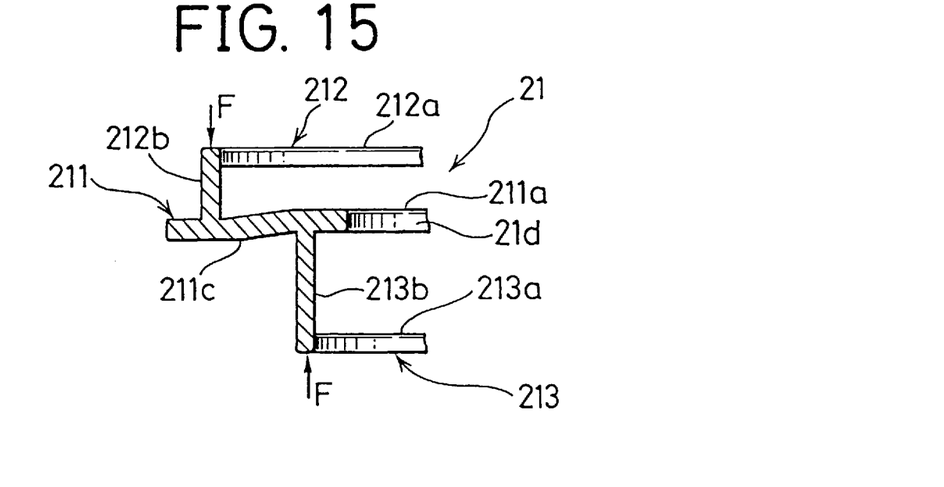
FIG. 15 shows an effect of a relay apparatus between relative rotary members according to the third embodiment of the present invention.

As shown in FIG. 13, FIG. 14 and FIG. 15, an upper cover 14a and a lower cover 12b exert a force F on an upper rib 212 and lower rib 213, respectively. Since the upper vertical stick-shaped element 212b and lower vertical stick-shaped element 213b are shifted and installed respectively in a radial direction, it is possible to bend the horizontal stick-shaped element 211c and to generate an elastic deformation easily. Thereby, there is little on the upper cover 14a and the lower cover 12b, so that the mobile body 21 corresponds to the dimension of the distance between the upper cover 14a and lower cover 12b. Accordingly, it is possible to minimize frictional force between the upper cover 14a and the upper circular stick-shaped element 212a, and frictional force between the lower cover 12b and the lower circular stick-shaped element 213a. Therefore, not only is moving resistance on the mobile body 21 reduced but also sleeve noise is reduced. Furthermore, since the mobile body 21 is usually contacted with the upper cover 14a and the lower cover 12b, shaking and the noise due to a gap between the mobile body 21, and the upper cover 14a and the lower cover 12b are prevented.

As described above, according to the third embodiment, the upper circular stick-shaped element 212a and the lower circular stick-shaped element 213a are contacted with the upper cover 14a and the lower cover 12b, respectively. However, the distance between the upper circular stick-shaped material 212a and the upper cover 14a can be eliminated. The upper vertical stick-shaped element 212b and lower vertical stick-shaped element 213b are shifted in a radial direction. However, the upper vertical stick-shaped element 212b and lower vertical stick-shaped element 213b can also be arranged up and down.

Although the inner circumferential stick-shaped element 211a and the outer circumferential stick-shaped element 211b are described as equilateral octagons, they are not necessarily restricted to equilateral octagons. Other polygon-shapes may also be used. However, preferably, they are equilateral polygons. Furthermore, the outer circumferential stick-shaped element 211b may be circular arc-shaped.

What is claimed is:

1. A cable reel comprising:
   an inner cylindrical member disposed for relative rotation within an outer cylindrical member, the respective side walls of said inner and outer members defining a circular space for accommodating a flat, flexible cable having one end portion coiled around the inner cylindrical member, said circular space being covered on an upper side by an upper cover and on a lower side by a lower cover, and a C-shaped movable member disposed for free rotational movement within the circular space adjacent the side wall of the outer cylindrical member, and having an inside polygonal circumferential surface for engaging the cable end portion coiled around the inner cylindrical member, said C-shaped movable member comprising a planar horizontal rib, a planar upper rib projecting vertically from the horizontal rib to contact said upper cover, and a planar lower rib projecting vertically from the horizontal rib to contact said lower cover, said upper and lower ribs being disposed for radial movement in said circular space and said C-shaped member having a gap in its perimeter defined by first and second member end portions, one having a concave surface and the other having a convex surface.

2. The cable reel of claim 1, wherein the gap accommodates extension therethrough of a portion of the cable disposed in the space between the inner cylindrical member and the C-shaped member.

3. The cable reel of claim 1 wherein said planar horizontal rib comprises a grid formed by intersecting elongated members.

4. The cable reel of claim 1 wherein said upper and lower ribs are each respectively frameworks comprised of a plurality of spaced, vertically projecting members intermittently connected at their respective upper and lower extremities by elongated horizontal members.

* * * * *